Nov. 15, 1966 E. L. BEAVER 3,285,686
BASKET SUPPORT
Filed Oct. 12, 1964

INVENTOR.
EDWARD L. BEAVER
BY
Wilson, Settle & Craig
ATTORNEYS

3,285,686
BASKET SUPPORT
Edward L. Beaver, 4842 Middlesex Ave., Dearborn, Mich.
Filed Oct. 12, 1964, Ser. No. 403,270
2 Claims. (Cl. 312—329)

This invention relates to basket supports and more particularly to such supports including cabinet sinks having a hollow body and a hinged door for supporting a basket in said hollow body.

It is an object of my invention to provide an improved basket support arrangement within a cabinet sink with the support being movable with the cabinet door for ready accessibility to the basket and have provisions for supporting the basket on its lower and upper ends in a readily releasable manner.

Other objects of this invention will appear in the following description and appended claims, reference being had to the accompanying drawings forming a part of this specification wherein like reference characters designate corresponding parts in the several views.

Figure 1:
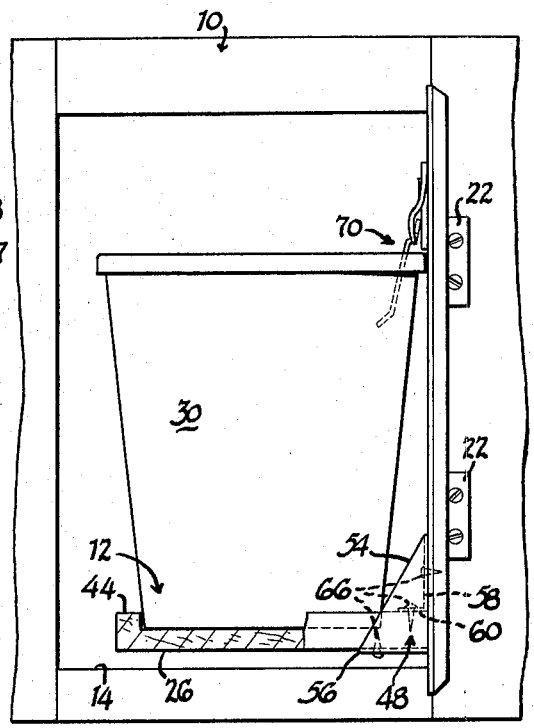
FIGURE 1 is a side view in elevation of a fragmentary portion of a cabinet sink with the cabinet door being open and showing the supporting members securing a basket to the door and embodying features of my invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

In accordance with my invention I provide a basket support within the hollow body of a cabinet sink. The cabinet is provided with a vertically hinged door with basket supporting members secured to the door so that the opening of the door will bring the basket in an accessible position. One of the supporting members is in the form of a shelf upon which the basket is positioned and this support is provided with a peripheral ledge to prevent the basket from sliding off of the shelf. Another supporting member is a snap acting upper clamp which has a downwardly extending portion which engages the inner side of the top portion of the basket to support it in an upright position. By this arrangement the basket is readily accessible and it may be readily released from its supports by actuating the snap acting clamp and lifting the basket so that it clears the shelf ledge, and then withdraw the basket from the door as the clamp is in released position. To replace the basket it is placed on the shelf and the snap acting clamp is returned to locking position. The shelf is designed to support any shape basket.

Referring to the drawings, the numeral 10 designates a cabinet sink having a hollow body 12 and a base 14. The hollow body 12 is closed on one side by a vertically hinged door 20 which is secured to the cabinet sink proper by hinges 22. The cabinet sink shown is provided with a single door. If desirable a two door sink may be used in the usual manner.

Secured to the lower part of the door 20 and extending into the hollow body 12 is a shelf support 26 for supporting a basket 30. The shelf support includes a portion 34 positioned adjacent the inner surface of the door 20 and parallel spaced apart side portions 38 extending at right angles from the door 20 and an arcuate portion 40 opposite the surface 34 and joining said side portions 38. The portions 38 and 40 are provided with a ledge 44 so that the basket 30 cannot slide off the shelf support 26 regardless of the shape of the basket. The shelf support 26 is secured to the door 20 by brackets 48 and 50. Bracket 48 includes a generally triangular member 54 and having a portion 56 united thereto and wrapped around the bottom of shelf 26 and a vertical section 58 which secures the bracket 48 to the door 20. A horizontal section 60 is joined to the vertical section 58. These sections are shown secured to the shelf 26 and door 20 by screws 66.

Thus, the basket moves with the shelf 26 upon opening of the door. The bracket 50 is the same as bracket 48 except that the triangular member thereof is on the opposite side of the bracket. Bracket 50 cooperates with shelf 26 and door 20 the same as bracket 48 to hold these parts together. The shelf 26 may be made of Fiberglas or plastic. The basket 30 may be made of plastic or other suitable material. The brackets 48 and 50 may be made of metal.

In order to support the basket 30 at the upper part thereof to prevent tilting I have provided a snap acting clamp 70 having a bracket part 71 which is secured to the door 20 above the basket by screw 72. The clamp 70 has a horizontal portion 73, a downwardly extending portion 74 inclined on approximately 45° angle and a horizontal end portion 75. The inclined portion 74 engages the inner side of the upper part of the basket 26 to lock the basket in an upright position.

Figure 4:
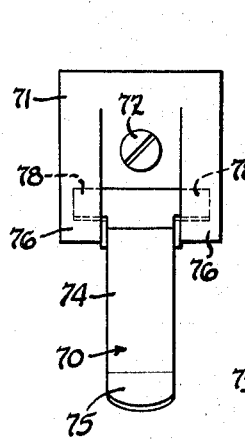
FIGURE 4 is a perspective view of a clamping support for the upper portion of the basket.
Figure 5:
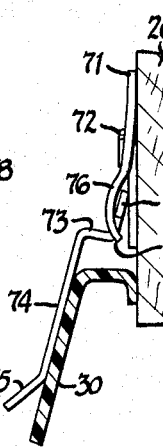
FIGURE 5 is a side view of the upper basket supporting member shown secured to a fragmentary section of the cabinet door.
Figure 6:
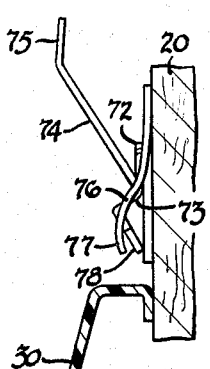
FIGURE 6 is a side view of the upper basket supporting member with its clamp engaging member shown in its upward basket released position.
Figure 2:
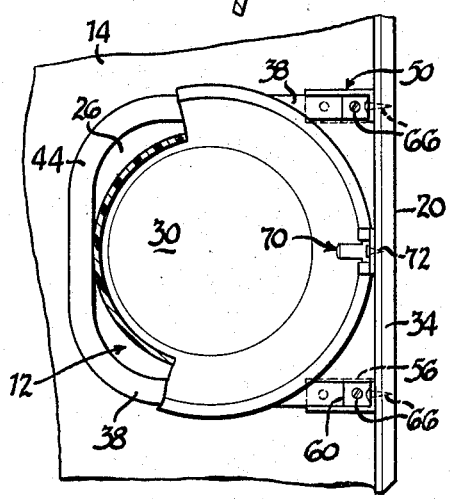
FIGURE 2 is a top view of the basket inside the cabinet sink with the basket being secured to the door with the door shown in cross section and the basket being partly broken away.
Figure 3:
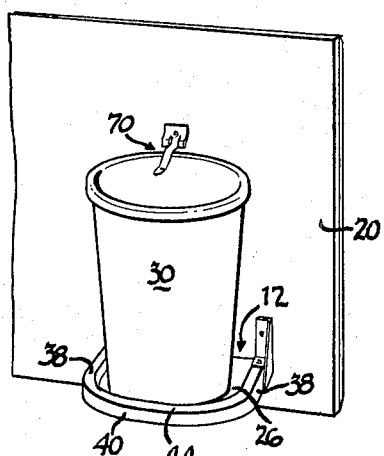
FIGURE 3 is a perspective view showing the basket secured to the cabinet door.

The bracket part 71 is of generally rectangular shape and is made of spring steel and could be made of any suitable resilient material and includes a downwardly extending leg 76 on each side of the downwardly extending portion 74. These legs are bowed as at 76 to accommodate arms 78 formed integral with the downwardly extending portion 74. The arms 78 are of greater width than thickness and when the portion 74 is moved toward its upward release position, which release position is shown in FIGURE 6, the arms 78 cause the legs 76 to be moved away from the door 20 until the lower portions of the arms 78 move past dead center so that the legs 76 move suddenly back again toward the door to provide a resilient snap action which causes the portion 74 to snap upwardly whereby the clamp is held in released position. The horizontal portion 75 of clamp 70 provides a lift portion for releasing the clamp 70. With the clamp being in released position the basket may be readily removed, and later replaced and locked in position by placing the basket on support 26 and snap the clamp 70 to locking position, which position is shown in FIGURES 4 and 5 to lock the upper portion of the basket against tilting. When the portion 74 is moved downwardly to lock position the arms 78 again cause the legs 76 to be moved outwardly from door 20 until the engaging edge of arms 78 pass dead center and at that time the resilient legs 76 produce a snap action by snapping the portion 74 downwardly to hold the clamp 70 and basket in locked position. The portions 73, 74 and 75 of clamp 70 may be made of any suitable metal. The bracket part 71 may be positioned somewhat above the basket for example one-half of one inch.

Although only a preferred form of the invention has been illustrated, and this form described in detail, it will be apparent to those skilled in the art that various modifications may be made therein without departing from the spirit of the invention or from the scope of the appended claims.

I claim:
1. The combination of a basket support structure with a vertically hinged door of a cabinet having a hollow body open on one side, and wherein the vertically hinged door closes said opening, the basket support structure comprising a horizontally positioned support for a basket adapted to be secured to and to be movable with said door and having spaced apart vertically extending brace members secured to the inner surface of said door and generally parallel spaced apart side portions extending substantially at right angles from said door and an arcuate portion spaced from said door and extending into said hollow body of the cabinet and joining said side portions and having a ledge thereabout to retain the lower portion of a basket, and a snap-acting clamp adapted to be secured on the inner surface of said door above said support and having an angular downwardly extending portion for engaging an inner surface of the upper edge of the basket to hold same in a locked but releasable position.

2. The invention defined in claim 1 wherein the position of the snap-acting clamp on the inner surface of the door may be varied vertically relative to the basket support structure to accommodate baskets of different vertical heights.

References Cited by the Examiner

UNITED STATES PATENTS

| 528,130 | 10/1894 | Pugh et al. | 283—24 |
| 1,427,375 | 8/1922 | Gove | 248—313 |
| 2,427,416 | 9/1947 | Petersen | 248—311 |
| 2,895,118 | 7/1959 | Huetten et al. | 248—361 X |
| 3,211,509 | 10/1965 | Sender | 312—329 |

CLAUDE A. LE ROY, *Primary Examiner.*

CHANCELLOR E. HARRIS, *Examiner.*

F. DOMOTOR, *Assistant Examiner.*